US012790248B2

(12) United States Patent
Griffis et al.

(10) Patent No.: US 12,790,248 B2
(45) Date of Patent: Nov. 10, 2026

(54) NANOFILTRATION PRETREATMENT OF SEAWATER FOR ELECTRODIALYSIS DESALINATION

(71) Applicant: EVOQUA WATER TECHNOLOGIES LLC, Pittsburgh, PA (US)

(72) Inventors: Joshua W. Griffis, Asburnham, MA (US); Li-Shiang Liang, Harvard, MA (US); Scott Waugh, Pepperell, MA (US); Charles P. Buzzel, Londerry, NH (US); Frederick C. Wilkins, Pepperell, MA (US); Gary C. Ganzi, Lexington, MA (US)

(73) Assignee: Evoqua Water Technologies LLC, Pittsburgh, PA (US)

( * ) Notice: Subject to any disclaimer, the term of this patent is extended or adjusted under 35 U.S.C. 154(b) by 338 days.

(21) Appl. No.: 18/692,025

(22) PCT Filed: Sep. 12, 2022

(86) PCT No.: PCT/US2022/043260
§ 371 (c)(1),
(2) Date: Mar. 14, 2024

(87) PCT Pub. No.: WO2023/039264
PCT Pub. Date: Mar. 16, 2023

(65) Prior Publication Data

US 2024/0228352 A1 Jul. 11, 2024

Related U.S. Application Data

(60) Provisional application No. 63/242,541, filed on Sep. 10, 2021.

(51) Int. Cl.
*C02F 9/00* (2023.01)
*B01D 61/02* (2006.01)
(Continued)

(52) U.S. Cl.
CPC ................ *C02F 9/00* (2013.01); *B01D 61/06* (2013.01); *B01D 61/58* (2013.01); *B01D 71/56* (2013.01);
(Continued)

(58) Field of Classification Search
CPC ........ B01D 2311/251; B01D 2311/252; B01D 2313/18; B01D 2313/246;
(Continued)

(56) References Cited

U.S. PATENT DOCUMENTS

| | | | |
|---|---|---|---|
| 5,308,466 | A | 5/1994 | Ganzi et al. |
| 5,736,023 | A | 4/1998 | Gallagher et al. |

(Continued)

FOREIGN PATENT DOCUMENTS

| | | | |
|---|---|---|---|
| AU | 2019356511 | A1 | 4/2021 |
| CN | 108623063 | A | 10/2018 |
| CN | 112823050 | A | 5/2021 |

OTHER PUBLICATIONS

Xiwen, Liu, "First Office Action", Chinese Patent Application No. 202280061236.9, mailed Feb. 15, 2026, 18 pages.

(Continued)

*Primary Examiner* — Dirk R Bass

(57) ABSTRACT

Systems for water desalination are disclosed. The systems include a source of non-potable water, a low pressure nanofiltration device, a first electrodialysis unit, a second electrodialysis unit, and recycle conduits. Methods of water desalination including directing non-potable water to a low pressure nanofiltration device, a first electrodialysis unit, and a second electrodialysis unit are also disclosed. Methods of facilitating water desalination by providing a water desalination system are also disclosed.

16 Claims, 5 Drawing Sheets

(51) Int. Cl.

| | |
|---|---|
| ***B01D 61/04*** | (2006.01) |
| ***B01D 61/06*** | (2006.01) |
| ***B01D 61/42*** | (2006.01) |
| ***B01D 61/48*** | (2006.01) |
| ***B01D 61/58*** | (2006.01) |
| ***B01D 71/56*** | (2006.01) |
| ***C02F 1/44*** | (2023.01) |
| ***C02F 1/469*** | (2023.01) |
| ***C02F 103/08*** | (2006.01) |

(52) U.S. Cl.

CPC ............ *B01D 61/027* (2013.01); *B01D 61/04* (2013.01); *B01D 61/423* (2022.08); *B01D 61/48* (2013.01); *B01D 2313/18* (2013.01); *B01D 2313/246* (2013.01); *B01D 2317/022* (2013.01); *B01D 2317/025* (2013.01); *B01D 2317/08* (2013.01); *C02F 1/442* (2013.01); *C02F 1/4695* (2013.01); *C02F 2103/08* (2013.01); *C02F 2209/40* (2013.01); *C02F 2301/046* (2013.01); *C02F 2301/08* (2013.01)

(58) Field of Classification Search

CPC ........ B01D 2317/022; B01D 2317/025; B01D 2317/08; B01D 61/027; B01D 61/04; B01D 61/06; B01D 61/422; B01D 61/423; B01D 61/48; B01D 61/58; B01D 71/56; C02F 1/442; C02F 1/4693; C02F 1/4695; C02F 2103/08; C02F 2209/40; C02F 2301/043; C02F 2301/046; C02F 2301/08; C02F 2303/10; C02F 9/00; Y02A 20/131

See application file for complete search history.

(56) References Cited

U.S. PATENT DOCUMENTS

| | | | |
|---|---|---|---|
| 6,284,124 | B1 | 9/2001 | DiMascio et al. |
| 6,312,577 | B1 | 11/2001 | Ganzi et al. |
| 6,508,936 | B1 | 1/2003 | Hassan |
| 6,723,241 | B2 | 4/2004 | Mickols |
| 6,824,662 | B2 | 11/2004 | Liang et al. |
| 7,744,760 | B2 | 6/2010 | Wilkins et al. |
| 7,790,837 | B2 | 9/2010 | McGrath et al. |
| 8,182,693 | B2 | 5/2012 | Wilkins et al. |
| 9,023,902 | B2 | 5/2015 | Lin et al. |
| 9,731,247 | B2 | 8/2017 | Lin et al. |
| 10,525,423 | B2 | 1/2020 | Wang et al. |
| 2003/0205526 | A1 | 11/2003 | Vuong |
| 2006/0060532 | A1 | 3/2006 | Davis |
| 2007/0080113 | A1 | 4/2007 | Vuong |
| 2011/0180477 | A1 | 7/2011 | Ganzl et al. |
| 2014/0183045 | A1 | 7/2014 | Fu et al. |
| 2015/0251137 | A1 | 9/2015 | Wallace |
| 2017/0050866 | A1 | 2/2017 | Ganzi et al. |
| 2019/0263697 | A1 | 8/2019 | Ganzi et al. |
| 2022/0062828 | A1 | 3/2022 | Gu et al. |
| 2022/0062829 | A1 | 3/2022 | Gu et al. |

OTHER PUBLICATIONS

Squella , Juan, "Expert Report", Chilean Patent Application No. 202400664, mailed Jun. 6, 2025.

Kukolka, Florian, "Extended European Search Report", European Patent Application No. 22868189.6, mailed Jul. 21, 2025.

Labban, Omar, "Modeling Low Pressure Nanofiltration Membranes and Hollow Fiber Modules for Softening and Pretreatment in Seawater Reverse Osmosis;" MIT, Jun. 2016.

International Search Report in corresponding PCT/US22/43260, dated Jan. 4, 2023.

Unknown, "Second Office Action", Chinese Patent Application No. 202280061236.9, mailed Jul. 23, 2026, 18 pages.

NF recovery = 50%

First ED water loss = 10%, energy = 0.42 kWh/m$^3$

Second ED energy = 0.36 kWh/m$^3$

| | Flow rate (m$^3$/h) | TDS (ppm) | Conductivity (µS/cm) | Velocity (cm/s) |
|---|---|---|---|---|
| 1 | 5.47 | 32,000 | 45.5 | |
| 1A | 3.76 | | | |
| 1B | 1.7108 | | | |
| 2A | 1.88 | 6,488 | 10.7 | 2.0 |
| 2B | 1.88 | 57,417 | 74 | |
| 3 | 1.692 | 2,751 | 5 | |
| 3A | 1.5228 | | | 1.62 |
| 4 | 1.5228 | 206 | 1 | |
| 5 | 2.068 | 32,219.48 | | |
| 6A | 0.1692 | 25,664.51 | 37.37 | |
| 6B | 1.88 | 31,429.81 | 44.7 | 2.0 |
| 7 | 0.1692 | | | 0.18 |

NF recovery = 50%

First ED water loss = 10%, energy = 0.42 kWh/m$^3$

Second ED energy = 0.36 kWh/m$^3$, recirculation = 90%

| | Flow rate (m$^3$/h) | TDS (ppm) | Conductivity (µS/cm) | Velocity (cm/s) |
|---|---|---|---|---|
| 1 | 5.11 | 32,000 | 45.5 | |
| 1A | 7.18 | 26,308.42 | 38.2 | |
| 2 | | | | 3.5908 |
| 2A | 1.88 | 6,488 | 10.7 | 2.0 |
| 2B | 5.3 | 57,417 | | |
| 3 | 1.692 | 2,751 | 5 | |
| 3A | 1.5228 | | 5 | 1.62 |
| 4 | 1.5228 | 206 | 1 | |
| 5 | 2.068 | 12,234.71 | 19.11 | |
| 6A | 0.1692 | 25,664.51 | 37.37 | |
| 6B | 1.88 | 9,446.56 | 15.11 | 2.0 |
| 7 | 0.1692 | | | 0.18 |

NANOFILTRATION PRETREATMENT OF SEAWATER FOR ELECTRODIALYSIS DESALINATION

CROSS-REFERENCE TO RELATED APPLICATIONS

This application is a U.S. national phase application and claims the benefit of priority under 35 U.S.C. § 371 to International (PCT) Patent Application Serial No. PCT/US2022/043260, titled "NANOFILTRATION PRETREATMENT OF SEAWATER FOR ELECTRODIALYSIS DESALINATION," filed on Sep. 12, 2022 which, in turn, claims priority under 35 U.S.C. § 119 (e) to U.S. Provisional Application Ser. No. 63/242,541, titled "NANOFILTRATION PRETREATMENT OF SEAWATER FOR ELECTRODIALYSIS DESALINATION," filed Sep. 10, 2021, each of which is incorporated herein by reference in its entirety for all purposes.

FIELD OF TECHNOLOGY

Aspects and embodiments disclosed herein are generally directed to water purification systems, and more specifically, to desalination systems which utilize pressure driven separation and electrically driven separation devices.

SUMMARY

In accordance with one aspect, there is provided a water desalination system. The system may comprise a source of non-potable water. The system may comprise a low pressure nanofiltration device having an inlet fluidly connectable to the source of the non-potable water, a permeate outlet, and a reject outlet. The system may comprise a first electrodialysis unit comprising a dilute compartment having a dilute inlet and a dilute outlet and a concentrate compartment having a concentrate inlet and a concentrate outlet, the dilute inlet of the first electrodialysis unit being fluidly connected to the permeate outlet. The system may comprise a second electrodialysis unit comprising a dilute compartment having a dilute inlet and a dilute outlet and a concentrate compartment having a concentrate inlet and a concentrate outlet, the dilute inlet of the second electrodialysis unit being fluidly connected to the dilute outlet of the first electrodialysis unit. In some embodiments, the concentrate inlet of the first electrodialysis unit may be fluidly connected to the concentrate outlet of the second electrodialysis unit and the source of the non-potable water. In some embodiments, the concentrate inlet of the second electrodialysis unit may be fluidly connected to the concentrate outlet of the second electrodialysis unit and the dilute outlet of the first electrodialysis unit.

The system may further comprise an energy recovery device having a first inlet fluidly connectable to the source of the non-potable water, a first outlet fluidly connected to the inlet of the nanofiltration device, and a second inlet fluidly connected to the reject outlet.

In some embodiments, the energy recovery device is constructed and arranged to recover at least 80% of energy from a reject stream to pressurize a non-potable water feed.

In some embodiments, the energy recovery device is constructed and arranged to pressurize the non-potable water feed to between about 200 psi and 600 psi.

In some embodiments, the system may further comprise a media filter positioned between the source of the non-potable water and the nanofiltration device.

The system may further comprise an electrodeionization unit fluidly connected to the dilute outlet of the second electrodialysis unit.

In some embodiments, the system is constructed and arranged to operate at less than 2.8 $kWh/m^3$ of water.

In some embodiments, the system is constructed and arranged to have a water recovery rate of 70%-90%.

In some embodiments, the nanofiltration device has a membrane comprising a polyamide layer on a porous support, the polyamide layer formed from a polyfunctional amine and a polyfunctional acid halide.

The system may further comprise a first valve positioned to selectively direct a first portion of a concentrate stream from the second electrodialysis unit to the inlet of the concentrate compartment of the first electrodialysis unit and a second portion of the concentrate stream from the second electrodialysis unit to the inlet of the concentrate compartment of the second electrodialysis unit.

The system may further comprise a controller operably connected to the first valve.

The system may further comprise a second valve positioned to selectively direct a first portion of a dilute stream from the first electrodialysis unit to the inlet of the dilute compartment of the second electrodialysis unit and a second portion of the dilute stream from the first electrodialysis unit to the inlet of the concentrate compartment of the second electrodialysis unit.

The system may further comprise a controller operably connected to the second valve.

In accordance with another aspect, there is provided a method of desalinating a non-potable water feed having a total dissolved solids (TDS) concentration of between about 2,000 ppm and about 40,000 ppm. The method may comprise directing a first portion of the non-potable water feed to a low pressure nanofiltration device to produce a permeate stream and a reject stream. The method may comprise directing the permeate stream to a dilute compartment of a first electrodialysis unit to produce a dilute stream. The method may comprise directing a first portion of the dilute stream from the first electrodialysis unit to a dilute compartment of a second electrodialysis unit to produce a product stream having less than about 500 ppm TDS.

The method may comprise directing a second portion of the dilute stream from the first electrodialysis unit to a concentrate compartment of the second electrodialysis unit to produce a concentrate stream. The method may comprise recycling a first portion of the concentrate stream from the second electrodialysis unit back to the concentrate compartment of the second electrodialysis unit with the second portion of the dilute stream from the first electrodialysis unit.

The method may comprise recycling a second portion of the concentrate stream from the second electrodialysis unit to the concentrate compartment of the first electrodialysis unit with a second portion of the non-potable water feed to produce a concentrate stream.

In some embodiments, the method may further comprise directing the first portion of the non-potable water feed to an energy recovery device to pressurize the first portion of the non-potable water feed directed to the nanofiltration device, and directing the reject stream to the energy recovery device to recover at least 80% of energy from the reject stream.

The method may comprise directing the first portion of the non-potable water feed to the nanofiltration device at a pressure of between about 200 psi and 600 psi.

The method may further comprise directing a seawater or brackish water stream to a media filter to produce the non-potable water feed.

In some embodiments, the method may further comprise directing the product stream to an electrodeionization unit to produce a polished product stream.

The method may comprise producing the product stream from the non-potable water feed at less than 2.8 kWh/m$^3$ of water.

The method may comprise desalinating the non-potable water feed at a water recovery rate of 70%-90%.

The method may comprise directing at least a portion of the concentrate stream from the first electrodialysis unit upstream from the nanofiltration device with the first portion of the non-potable water feed.

The method may further comprise controlling a ratio of the first portion of the dilute stream directed to the dilute compartment of the second electrodialysis unit to the second portion of the dilute stream directed to the concentrate compartment of the second electrodialysis unit.

The method may further comprise controlling a ratio of the first portion of the concentrate stream recycled back to the concentrate compartment of the second electrodialysis unit to the second portion of the concentrate stream recycled to the concentrate compartment of the first electrodialysis unit.

In accordance with another aspect, there is provided a method of facilitating water desalination. The method may comprise providing a water desalination system comprising a low pressure nanofiltration device having an inlet fluidly connectable to a source of non-potable water, a permeate outlet, and a reject outlet; a first electrodialysis unit comprising a dilute compartment fluidly connected to the permeate outlet and a concentrate compartment fluidly connectable to the source of the non-potable water; a second electrodialysis unit comprising a dilute compartment fluidly connected to the dilute compartment of the first electrodialysis unit and a concentrate compartment fluidly connected to the dilute compartment of the first electrodialysis unit; a first recycle conduit extending from the concentrate compartment of the second electrodialysis unit to the concentrate compartment of the first electrodialysis unit; and a second recycle conduit extending from the concentrate compartment of the second electrodialysis unit back to the concentrate compartment of the second electrodialysis unit. The method may comprise providing instructions to fluidly connect the source of non-potable water to the inlet of the nanofiltration device and to the concentrate compartment of the first electrodialysis unit.

In some embodiments, the method may further comprise providing the source of non-potable water having a total dissolved solids (TDS) concentration of between about 2,000 ppm and about 40,000 ppm.

The method may further comprise providing instructions to operate the water desalination system to produce a product stream from the dilute compartment of the second electrodialysis device having less than 500 ppm TDS at less than 2.8 kWh/m$^3$ of water.

The method may further comprise providing a controller configured to selectively direct a concentrate stream from the concentrate compartment of the second electrodialysis unit through the first recycle conduit and through the second recycle conduit.

In some embodiments, the controller is configured to selectively direct a dilute stream from the dilute compartment of the first electrodialysis unit to the dilute compartment of the second electrodialysis unit and to the concentrate compartment of the second electrodialysis unit.

The method may further comprise providing a third recycle conduit extending from the concentrate compartment of the first electrodialysis unit to the inlet of the nanofiltration device.

The disclosure contemplates all combinations of any one or more of the foregoing aspects and/or embodiments, as well as combinations with any one or more of the embodiments set forth in the detailed description and any examples.

BRIEF DESCRIPTION OF THE DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings.

DETAILED DESCRIPTION

Figure 1:
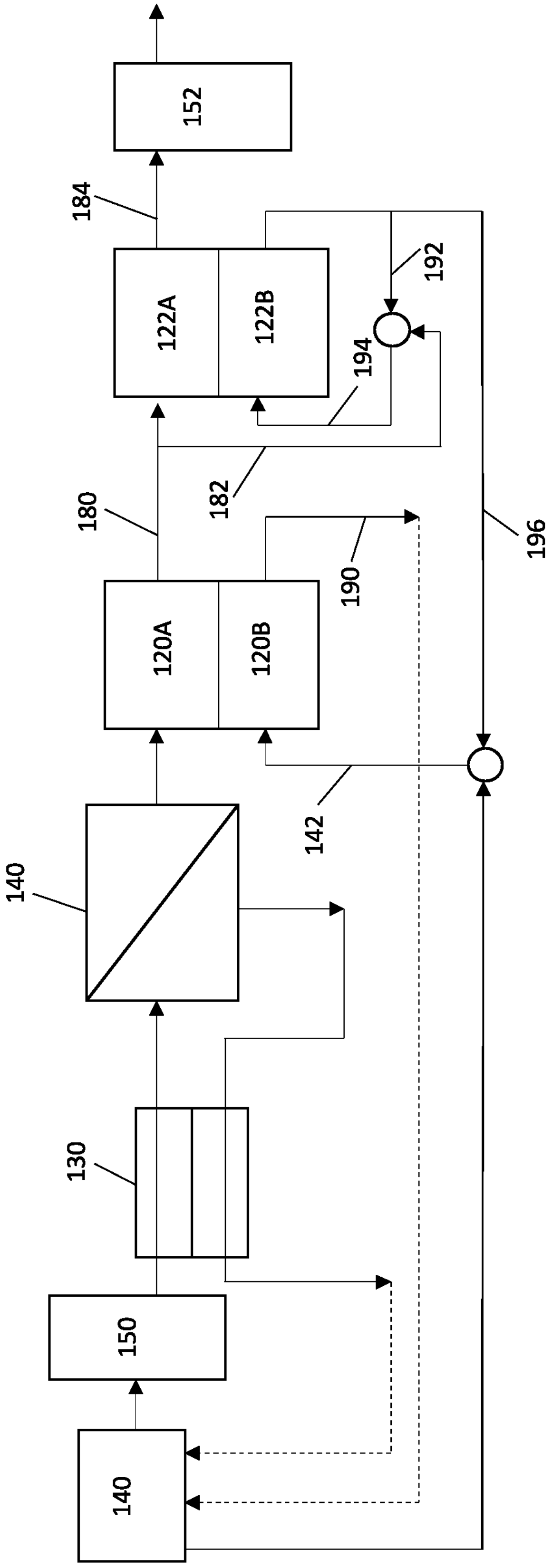
FIG. 1 is a schematic diagram of a water desalination system, according to one embodiment.

A growing worldwide need for fresh water for potable, industrial, and agricultural uses has led to an increase in the need for purification methods that use seawater, brackish water, or other elevated salinity water as sources. The purification of high salinity water through the removal of dissolved solids, such as salts, has been accomplished in several ways including distillation and reverse osmosis (RO). These methods start with a pretreated feed of seawater or other brackish water and then purify (e.g., desalt) the water to a level that is suitable for human consumption or other purposes. While seawater and often, brackish water, is a plentiful starting material, the energy required to convert it to drinking water using present RO or distillation techniques is often cost prohibitive.

The ocean provides a limitless source of water if efficient desalination techniques can be developed with low environmental impact. While equipment cost can be high, the greatest continuing expense in desalting high salinity water is energy. A small improvement in energy efficiency can result in significant cost savings due to the large volumes of water that are typically processed by desalination systems.

For example, the energy required to produce potable water from seawater by the RO process is comprised primarily of the energy that is required to overcome the osmotic pressure of the seawater, along with pressure loss inefficiencies during processing. Because both RO permeate and RO wastewater (often 70% of the total water fed to the system is lost to waste) must be pressurized, RO energy consumption is much higher than the theoretical thermodynamic minimum for desalination. Expensive mechanical pressure recovery devices are commonly needed in an attempt to recover some of the lost energy required for pressurization.

Seawater typically contains about 20,000-40,000 ppm (mg/l) of total dissolved solids (TDS), and brackish water sources can contain from 2,000 ppm to as much as 20,000 ppm TDS. These dissolved solids include a variety of monovalent, divalent, polyvalent, and/or multivalent salts or species. Sodium chloride may typically form about 75% or more of the total solids content.

Reverse osmosis techniques can be effective at removing ionic compounds from seawater. However, one serious drawback of RO systems is that RO membranes selectively reject non-monovalent or multivalent salts to a higher extent than monovalent salts. Thus, for purification purposes in applications such as agriculture, where most divalent ions such as calcium and magnesium are beneficial for irrigation use, these ions are rejected selectively, resulting in higher than needed operating pressures, increased potential for membrane fouling and scaling, and/or loss of valuable minerals for use in crop production.

The difference in osmotic pressure between seawater containing over 3.5% solids and potable water at less than, 1,000 ppm TDS or less than 500 ppm TDS, dictates that high pressures be used to produce a permeate of potable quality simply to overcome the thermodynamic free energy potential. In practice, since seawater is usually processed at elevated water recoveries to reduce pretreatment cost by reducing the amount of water that needs to be effectively prepared for treatment, the required osmotic pressure is even higher than needed to process seawater at 3.5% solids. For example, pressures utilized in RO systems are typically greater than 800 psi, 900 psi, or even 1,000 psi. For practical considerations of high-pressure operation, corrosion resistance, avoidance of energy losses, and prevention of scaling due to divalent selectivity and silica rejection, RO systems are limited to water recoveries (the ratio of product water production to total water production) of around 30% to 40%. This limitation results in a very high incremental cost of pretreatment and water use for RO systems when it is considered that a change in water recovery from about 67% to about 33% results in a doubling of pretreatment equipment cost and a doubling of overall water consumption for a given pure water need. The most recent advances in RO membranes and energy reuse techniques have reduced the power consumption of producing potable water using RO systems to about 7 to 14 kWh per 1,000 gallons (14 kWh/kgal) of water produced, which is still relatively high considering the high capital costs.

While evaporative methods such as distillation have been traditionally used to produce potable water, these methods typically require even greater amounts of energy than do systems utilizing reverse osmosis techniques. These systems typically utilize complicated heat recovery techniques to improve energy efficiency. Further, because RO and distillation-based processes operate at elevated pressures or temperatures, and because high salinity water is very corrosive, exotic metals and alloys are needed to withstand the operation conditions, and thus the need to add specialized materials in these systems further increases the initial cost of the equipment and greatly decreases the equipment reliability.

Alternative techniques using a combination of processes have also provided for lower energy consumption in the conversion of seawater to fresh water. For example, nanofiltration techniques have been used in conjunction with either RO or flash distillation techniques, as described in in U.S. Patent Application Publication No. US2003/0205526, titled "Two stage nanofiltration seawater desalination system," which is incorporated herein by reference in its entirety for all purposes. However, such combinations may still require relatively high energy consumption and expensive equipment.

Two-pass nanofiltration systems have been shown to be capable of producing potable water using a total working pressure of about 750 psi from about 500 psi in a first stage and about 250 psi in a second stage, as described in U.S. Pat. No. 6,508,936, titled "Process for desalination of saline water, especially water, having increased product yield and quality," which is incorporated herein by reference in its entirety for all purposes. Because energy usage relates to operating pressure, a total working pressure of about 750 psi provides for a more energy efficient system compared to a typical RO system operating at a pressure greater than 800 psi.

Nanofiltration systems have been used in conjunction with continuous electrodeionization (CEDI) systems to produce potable water from seawater, as described in U.S. Pat. Nos. 7,744,760 and 8,182,693, titled "Method and apparatus for desalination," each of which is incorporated herein by reference in its entirety for all purposes. Such systems may be operated at a reduced total working pressure of about 600 psi, further increasing energy savings as compared to a typical RO system. Even further energy reduction may be achieved by incorporating energy recovery devices, as disclosed herein. Furthermore, improved water recovery may be achieved by the use of electrodialysis devices (ED) and incorporating water recirculation between concentrate compartments of the electrodialysis devices to balance conductivity between membranes. Reducing water loss also has the additional benefit of reducing the energy requirement due to the improved rate of potable water production.

Disclosed herein is a water desalination system containing a nanofiltration device upstream from an electrodialysis process. The electrodialysis can be performed in a multistage electrodialysis system. For example, a two-stage, three-stage, four-stage, or more electrodialysis system. Optionally, an electrodeionization unit may be positioned downstream from the electrodialysis system to polish the product water. The resulting system is capable of operating at a reduced working pressure, such as a pressure below 600 psi, for example 200 psi to 600 psi or 400 psi to 600 psi. Furthermore, the electrodialysis devices are capable of operating at a reduced water loss, for example, 10% water loss or less.

When using nanofiltration for desalination of seawater, it is possible to operate at pressures that are far lower than required for a typical RO system, while also achieving removal of divalent ions. For example, with nanofiltration seawater can be softened with applied pressures of between 2 to 4 bar, while not removing sodium. Thus, it is believed that the use of nanofiltration to pretreat seawater directed to an electrodialysis (ED) unit or multistage system offers synergies in both energy reduction and performance.

One skilled in the art understands that the performance of ED and the electrical characteristics are affected when divalent ions are in the feed water. Divalent ions in the feed to an ED process typically increase the electrical resistance, and thus consume more power. By using NF to remove divalent ions, upstream from the ED, the resulting feed water to the ED process comprises a mostly sodium chloride feed. This enables the ED process to operate efficiently. Therefore, a combination process that uses low pressure NF to provide a softened feed water to an ED process for seawater desalination tends to yield a low power consumption process, which is thus more economical. Furthermore, low-pressure materials, such as PVC piping, may be used. Thus, the systems described herein may be constructed with a lower cost of materials, as compared to a system having a high-pressure RO.

In accordance with one aspect, there is provided a water desalination system and methods for desalinating non-potable water to produce potable water. Potable water typically has a total dissolved solids (TDS) concentration of less than about 1,000 ppm. In some cases, potable water may refer to drinking water complying with regulatory requirements (for example, World Health Organization (WHO) requirements). Such potable water may have a TDS concentration of less than about 500 ppm. Non-potable water may be water having a TDS concentration greater than a concentration required to comply with regulatory requirements for drinking water. For instance, in some embodiments, non-potable water may have a TDS concentration of 500 ppm or more, 1,000 ppm or more, 2,000 ppm or more, or 3,000 ppm or more. Examples of non-potable water include seawater or salt water, brackish water, gray water, and some industrial water. Seawater may refer to water having a TDS concentration of between about 20,000 ppm and 40,000 ppm. Brackish water may refer to water having a TDS concentration of 2,000 ppm to 20,000 ppm. It should be noted that references to seawater herein are generally applicable to other forms of non-potable water.

In accordance with certain aspects, the systems and methods disclosed herein involve electrochemical treatment of water. Electrochemical treatment includes processes such as electrodialysis (ED), such as filled cell electrodialysis, and current reversing electrodialysis, electrodiaresis, and electrodeionization, such as continuous electrodeionization (CEDI). As used herein, "treatment" or "purification" of water relates to reducing the total dissolved solids content and optionally to reducing the concentration of suspended solids, colloidal content and/or ionized and non-ionized impurities in a source water. Treatment or purification may be performed to a level where the purified water has been rendered potable and can be used for fresh-water purposes such as, but not limited to, human and animal consumption, irrigation, and industrial applications.

Desalination is a type of purification in which salt is removed from non-potable water, such as seawater. In certain aspects, the disclosure pertains to desalination of seawater. The feed water or water to be treated may be from a variety of sources including those having a TDS concentration of between about 2,000 ppm and about 40,000 ppm, or more. Feed water can be, for example, any non-potable water, such as seawater, brackish water, gray water, industrial effluent, and oil fill recovery water. The feed water may contain high levels of monovalent salts, divalent and multivalent salts, and organic species. In accordance with one or more embodiments, the disclosure is directed to systems and methods for treating non-potable water comprising a solute mixture, wherein monovalent ions are at a higher concentration as compared to the concentration of divalent and other multivalent ions.

The systems and methods disclosed herein may combine pressure-driven separation systems, such as nanofiltration, to remove a portion of the TDS in the non-potable water, and one or more electrically-driven separation systems, such as electrodialysis, to remove an additional portion of the TDS in the first filtered water, to eventually produce potable water. The pressure-driven separation system, in some cases, may be a nanofiltration (NF) device. In accordance with other embodiments, one or more electrically-driven separation systems such as, but not limited to, electrodialysis, electrodiaresis, or electrodeionization, can be utilized with to purify, e.g., desalinate, water.

The systems and methods of desalinating water disclosed herein may be performed at reduced energy levels, for example, as low as less than 3.0 kWh/m$^3$, less than 2.8 kWh/m$^3$, less than 2.6 kWh/m$^3$, less than 2.4 kWh/m$^3$, less than 2.4 kWh/m$^3$, less than 2.0 kWh/m$^3$, less than 1.8 kWh/m$^3$, or less than 1.6 kWh/m$^3$ for desalination of seawater (20,000 to 40,000 ppm TDS) to produce potable water (less than 500 ppm TDS). The systems and methods disclosed herein may be performed at a water recovery rate of 30%-95%, for example, at least 30%, at least 50%, at least 70%, or 70%-90%. Furthermore, the systems disclosed herein may be designed to provide a product water having a selected composition, for example, by selecting properties of one or more unit operations, such as divalent/multivalent and monovalent ion removal rate of a nanofiltration device and selective monovalent ion removal by one or more ED units, when considering the composition of the product water feed. Conventional desalination systems require higher energy levels, provide a lower water recovery, and do not accommodate for selected compositions of product water.

In addition to lower energy costs, the systems and methods disclosed herein can provide lower capital, operating, and/or maintenance costs. For example, due to an ability to operate at lower operating pressures, lower cost materials, such as plastic piping, can be employed in the systems of the invention, instead of high-pressure stainless steel and/or titanium alloys that are typically necessary in RO systems.

In accordance with certain embodiments, the methods disclosed herein may involve directing a non-potable water feed to a pressure-drive separation system, such as a nanofiltration unit. Nanofiltration may be used to remove species smaller than that which can be removed by ultrafiltration (UF) and requires less energy than reverse osmosis, even though nanofiltration may not remove all species that can be removed by reverse osmosis. Nanofiltration membranes may incorporate both steric and electrical effects in rejecting or selectively separating dissolved species. Thus, for example, nanofiltration membranes may also remove or reduce the concentration of uncharged organic molecules including, for example, organic molecules having a molecular weight of greater than about 150 Daltons or, in some cases, greater than about 300 Daltons.

Nanofiltration may typically remove divalent and/or multivalent ions at a rate of greater than about 80%, greater than about 90%, and in some cases, greater than about 95%. In certain embodiments, nanofiltration may remove greater than about 98% of the multivalent species. Certain nanofiltration systems, however, are less efficient at removing monovalent ions than divalent or non-monovalent ions and may remove, for example, less than about 10%, less than about 25%, less than about 50%, less than about 75%, or less than about 90% of the monovalent ions present in a feed water to be treated. Other nanofiltration systems remove substantial amounts of both divalent/multivalent and monovalent ions. For example, certain nanofiltration systems may remove at least 25%, at least 50%, at least 75%, or at least 90% of the monovalent ions present in the feed water. Thus, it is possible to design a system to fit a specific feed water quality and produce a nanofiltration permeate having a selected composition.

One exemplary system may comprise a nanofiltration device selected to remove 75%-95%, for example, 80%-90% divalent/multivalent species. The exemplary nanofiltration device may remove 50%-80%, for example, 60%-70% monovalent species.

The nanofiltration membrane may comprise polyamide barrier layer and a microporous polysulfone layer interlayer, on a polyester support. Typically, each membrane is produced in sheet form and assembled into a cartridge. Nanofiltration membranes may be made from a variety of materials, including, for example, polyamide materials, as disclosed in U.S. Pat. No. 6,723,241, titled "Composite membrane and method for making the same" and U.S. Pat. No. 6,508,936, titled "Process for desalination of saline water, especially water, having increased product yield and quality," as well as U.S. Patent Application Publication No. 2003/0205526, titled "Two stage nanofiltration seawater desalination system," each of which is incorporated by reference herein in its entirety for all purposes.

The polyamide material may be immobilized on a porous support. In some embodiments, the polyamide layer may be formed from a polyfunctional amine and a polyfunctional acid halide. The polyfunctional amine monomer may have primary or secondary amino groups and may be aromatic (e.g., m-phenylenediamine, p-phenyenediamine, 1,3,5-triaminobenzene, 1,3,4-triaminobenzene, 3,5-diaminobenzoic acid, 2,4-diaminotoluene, 2,4-diaminoanisole, and xylylenediamine) or aliphatic (e.g., ethylenediamine, propylenediamine, and tris(2-diaminoethyl)amine). Examples of polyamine species include primary aromatic amines having two or three amino groups, such as m-phenylene diamine, and secondary aliphatic amines having two amino groups, such as piperazine. The polyfunctional acid halide may be aromatic in nature and contain at least two or three acyl halide groups per molecule. Exemplary polyfunctional acid halides include bromide, iodide, and chloride compounds, such as trimesoyl chloride (TMC).

In some embodiments, the nanofiltration membrane may be formed of an inner polymer layer coated with a positively charged selective layer, as disclosed in U.S. Pat. No. 10,525,423, titled "Nanofiltration membrane and method of manufacturing a nanofiltration membrane," which is herein incorporated by reference in its entirety for all purposes. In some embodiments, the inner layer may be polyethersulfone. The positively charged selective layer may comprise or consist of poly(amide-imide) cross-linked with polyallylamine. In some embodiments, the positively charged selective layer may comprise a fiber substrate of poly(amide-imide) cross-linked only on its outer layer with polyallylamine. Optionally, the fiber substrate of poly(amide-imide) may be treated with glycerol before cross-linking. The membrane may be formed by cross-linking the layer comprising or consisting of poly(amide-imide) with polyallylamine to form the selective layer.

The positively charged selective layer nanofiltration membrane may provide for high rejection to divalent cations and low rejection to monovalent cations. For instance, the rejection to divalent cations may be as high as 96%, for example, from 88% to 96%. The rejection to monovalent cations may be as low as −11%, for example, in the range from −11% to 12%. The difference in rejection level of the nanofiltration membrane to cations, depending on the charge present on the cations, means that the nanofiltration membrane may achieve high selectivity of divalent cations over monovalent cations. As a result, the membrane may perform at high flux under low operating pressure.

In some embodiments, the nanofiltration membrane may be formed of a polymer backbone functionalized with an active coating, as disclosed in U.S. Pat. No. 7,790,837, titled "Ion-conducting sulfonated polymeric materials," which is herein incorporated by reference in its entirety for all purposes. Exemplary coatings include sulfonated polymers, such as sulfonated polyether sulfone (SPES), sulfonated polyether ether ketone (SPEEK), and others. Such membranes are collectively referred to herein as thin film composite sulfonated polysulfone membranes. In some embodiments, the membrane may be formed by sulfonating a polymer backbone. In other embodiments, the membrane may be formed by polymerizing a sulfonated activated aromatic monomer and an unsulfonated activated aromatic monomer with a suitable comonomer to form a sulfonated aromatic copolymer.

Thin film composite sulfonated polysulfone membranes may be designed with variable amounts of charge density. For instance, membranes with a high charge density may generally be used as RO membranes with relatively low flux, while membranes with low charge density may generally be used as NF membranes with very high flux. Furthermore, NF membranes with a relatively low charge density advantageously perform at high flux with low energy use.

Typically, overall salt rejection is affected by small amounts of calcium and magnesium. For instance, when treating feed water having more than 1 ppm calcium and magnesium, flux increases, allowing the membrane to maintain high calcium and magnesium removal with low monovalent removal (e.g., sodium or potassium). This property may be detrimental in certain applications. However, such a membrane is ideal for pretreatment to ED, which achieves high removal of monovalent ions with lower effectiveness for removal of divalent ions. Accordingly, the thin film composite sulfonated nanofiltration membranes may be used for treatment of non-potable water containing calcium and magnesium, for example, more than 1 ppm calcium and magnesium, without the need for pre-treatment softening.

Thin film composite sulfonated polysulfone membranes are also generally chlorine resistant and fouling resistant. Polyamide membranes typically cannot withstand chlorine and may require pretreatment with chlorine removal by bisulfite or activated carbon. Without chlorine however, there is a high risk of bacterial growth and fouling. For brackish and seawater applications, polyamide membranes may experience bacterial growth leading to fouling. The sulfonated polysulfone membranes may advantageously be used with a chlorinated feed, controlling bacterial growth on the membrane. Furthermore, even if small quantities of chlorine get through the polysulfone membranes, downstream ED units may also handle a small amount of chlorine. Thus, the thin film composite sulfonated nanofiltration membranes may be used for treatment of non-potable water feeds containing chlorine, without the need for a chlorine removal pretreatment. In certain embodiments, the non-potable water feed may be dosed with chlorine.

The associated operating pressure required to treat water utilizing nanofiltration membranes may be significantly less than the operating pressure required to pass water through RO membranes, where the monovalent salts contribute greatly to the difference in osmotic pressure between the feed and the permeate. For instance, in accordance with certain embodiments, the feed water may be purified in a low pressure nanofiltration device having an operating pressure of less than about 600 psi, in some cases, less than about 500 psi, or in some cases, less than or equal to about 400 psi. One exemplary low pressure nanofiltration device may have an operating pressure of 200 psi-600 psi, for example, 400 psi-600 psi. The permeate resulting from the low pressure nanofiltration device may typically be reduced in organic species concentration and divalent and non-monovalent ion concentration by greater than about 90%, while operating at an energy requirement of less than or equal to about 5 kWh/kgal (1.32 kWh/$m^3$), for example, in some cases less than or equal to about 4.7 kWh/kgal (1.24 kWh/$m^3$), or in some cases less than or equal to 4.5 kWh/kgal (1.19 kWh/$m^3$). Systems having such low pressure nanofiltration devices generally require less energy to pump the feed into the nanofiltration device.

In certain embodiments, for example, depending on the specific composition of the feed water, about 25%-50% of the monovalent ions may be retained or retrieved, in some embodiments, about 50%-75% of the monovalent ions may be retained or retrieved, and in some embodiments, more than about 75% of the monovalent ions may be retained or retrieved. Therefore, a nanofiltration device having seawater, brackish water, or similar non-potable water feed may provide a permeate that is substantially reduced in divalent and non-monovalent ionic constituents, and/or organic constituents but may retain a significant portion or a selected amount of the initial monovalent ion constituents, such as, sodium chloride. The permeate, when compared to the feed, may exhibit a reduction in TDS of greater than or equal to about 30% (in some cases, up to and including about 95%).

The methods may comprise directing the nanofiltration permeate having reduced divalent and non-monovalent species to an electrically-driven separation system, such as one or more electrodialysis (ED) units. In particular, the methods may comprise directing the nanofiltration permeate stream to a dilute compartment of an ED unite to produce a dilute stream. ED is a process that removes, or at least reduces, one or more ionized or ionizable species from water using an electric potential to influence ion transport. ED devices may comprise a plurality of adjacent cells or compartments which are typically separated by selectively permeable membranes that allow the passage of either positively or negatively charged species, but typically not both. Dilution or depletion compartments are typically interspaced with concentrating or concentration compartments in such devices. As water flows through the depletion compartments, ionic and other charged species are typically drawn into concentrating compartments under the influence of an electric field, such as a DC field. Positively charged species are drawn toward a cathode, typically located at one end of a stack of multiple depletion and concentration compartments, and negatively charged species are likewise drawn toward an anode of such devices, typically located at the opposite end of the stack of compartments.

The electrodes are typically housed in electrolyte compartments that are usually partially isolated from fluid communication with the depletion and/or concentration compartments. Once in a concentration compartment, charged species are typically trapped by a barrier of selectively permeable membrane at least partially defining the concentration compartment. For example, anions are typically prevented from migrating further toward the cathode, out of the concentration compartment, by a cation selective membrane. Once captured in the concentrating compartment, trapped charged species can be removed in a concentrate stream.

In ED devices, the DC field is typically applied to the cells from a source of voltage and electric current applied to the electrodes (anode or positive electrode, and cathode or negative electrode). The voltage and current source (collectively "power supply") can be itself powered by a variety of means such as an AC power source, or for example, a power source derived from solar, wind, or wave power. In certain embodiments, the ED unit may be associated with an energy recovery device, further reducing the energy requirement of the unit. Such energy recovery devices may be configured to recover at least 25% energy, for example, at least 40% energy, such as 40%-80% energy, from fluid streams within the system for operation of the ED unit.

At the electrode/liquid interfaces, electrochemical half-cell reactions occur that initiate and/or facilitate the transfer of ions through the membranes and compartments. The specific electrochemical reactions that occur at the electrode/interfaces can be controlled to some extent by the concentration of salts in the specialized compartments that house the electrode assemblies. For example, a feed to the anode electrolyte compartments that is high in sodium chloride will tend to generate chlorine gas and hydrogen ion, while such a feed to the cathode electrolyte compartment will tend to generate hydrogen gas and hydroxide ion.

Generally, the hydrogen ion generated at the anode compartment will associate with a free anion, such as chloride ion, to preserve charge neutrality and create hydrochloric acid solution, and analogously, the hydroxide ion generated at the cathode compartment will associate with a free cation, such as sodium, to preserve charge neutrality and create sodium hydroxide solution. In accordance with further embodiments, the reaction products of the electrode compartments, such as generated chlorine gas and sodium hydroxide, can be utilized in the process as needed for disinfection purposes, for membrane cleaning and de-fouling purposes, and/or for pH adjustment purposes.

ED devices may remove monovalent cations and/or anions, such as sodium chloride, from the divalent and multivalent depleted nanofiltration permeate. One added benefit is that the ED devices may additionally operate at lower power consumption on such nanofiltration permeate streams having reduced divalent ions. For instance, an ED unit positioned downstream from such a nanofiltration device may remove monovalent ions while operating at an energy requirement of less than or equal to about 1.6 $kWh/m^3$, for example, in some cases less than or equal to about 1.0 $kWh/m^3$, or in some cases less than or equal to about 0.5 $kWh/m^3$. Each subsequent ED stage may operate at a lower energy requirement, for example, an energy requirement of about 5%-10% lower than the previous stage. Furthermore, use of an energy recovery device with the ED unit may reduce the energy requirement of the ED unit by at least 5%, for example, at least 10%, at least 25%, or at least 50%.

Furthermore, a nanofiltration device preceding the ED unit may significantly decrease, or even eliminate, fouling of downstream unit operations and/or components, such as in the concentration compartments and associated housing assemblies as well as, fittings and conduits. Therefore, one or more nanofiltration devices can be advantageously used to remove divalent and/or multivalent ions, such as hardness-causing species, and one or more ED devices can be advantageously used to remove monovalent ions, thus reducing or eliminating fouling tendencies. For instance, in certain embodiments, the system may be configured to reduce or even eliminate the conventionally required de-fouling procedures, such as polarity reversal, which typically result in water loss, energy loss, and downtime.

The systems disclosed herein may include one or more ED devices positioned in series or other suitable arrangement. Additionally or alternatively, one or more passes at each ED unit may be employed. In certain embodiments, the methods may include directing a dilute stream from a first ED unit to a dilute compartment of a second ED unit to produce a product stream. One or more ED units may be employed in series to produce the desired product stream.

In certain embodiments, the nanofiltration permeate can be purified in stages (each stage defined by an ED device) in which each stage selectively removes one or more desired type of dissolved solid thereby producing purified, e.g., desalted, or even potable, water. In some cases, each of the one or more stages can comprise one or more unit operations for selective retention of a desired type of dissolved species.

Optionally, the retained species can then be removed in one or more subsequent or downstream stages utilizing one or more other unit operations. Thus, in some embodiments of the purification system, a first stage can remove or at least reduce the concentration of one or more desired type of dissolved species. In other embodiments, the first stage can remove or reduce the concentration of all but one or more desired type of dissolved species. Any retained species, not removed from the water, can then be removed or the concentration thereof reduced in one or more subsequent stages. Thus, the systems and methods disclosed herein may be used to produce a product having a selected composition.

In some embodiments, it may be desirable to reduce the internal electrical resistance of the ED device to minimize energy usage. Therefore, in accordance with one or more embodiments, low electrical resistance membranes may be used to separate or define depletion and/or concentration compartments thereof. For example, individual compartments, or cells of the ED device, may be constructed to have a width of less than about 10 millimeters. The use of low electrical resistance membranes and/or thin compartments can help to reduce electrical resistance or load and, therefore, serve to decrease electrical power requirements. Low electrical resistance membranes that may be utilized in accordance with some embodiments of the invention include, for example, those commercially available as NEOSEPTA® membranes (distributed by ASTOM Corporation, Tokyo, Japan). In some embodiments, intermembrane spacing may be, for example, less than about 0.1 inch, less than or equal to about 0.06 inch, or less than or equal to about 0.05 inch.

Furthermore, the ED devices may operate at reduced water loss. For instance, each ED unit may operate at a water loss of less than 12%, for example, less than 11%, less than 10%, less than 9%, or less than 8%. Reduced water loss through the membrane (from the dilute compartment to the concentrate compartment) may improve water recovery of the system, further reducing the energy requirement by increasing the rate of produced potable water. Reduced water loss may be achieved through the use of selected ion exchange membranes and recirculation of concentrate streams within the system to balance conductivity between the dilute and concentrate compartments.

In some embodiments, the ED device may comprise a thin film ion exchange membrane, as disclosed in U.S. Pat. Nos. 9,023,902 and 9,731,247, titled "Ion exchange membranes," each of which is herein incorporated by reference in its entirety for all purposes. The ion exchange membrane may be formed of a microporous membrane support and a crosslinked ion transferring polymer filling the porous structure, comprising the polymerization product of at least one hydrophilic ionogenic monomer and a hydrophobic cross-linking monomer. Such membranes are effective in desalination of seawater due to their low electrical resistance (for instance, no greater than about approximately 1.0 Ohm-cm$^2$ or 0.5 Ohm-cm$^2$) and high permselectivity (for instance, greater than about 95% or greater than about 99% for cation exchange membranes and greater than about 90% or greater than about 95% for anion exchange membranes). The thin film ion exchange membranes may reduce water loss from the dilute compartment to the concentrate compartment of the ED device, improving water recovery and reducing energy consumption of the system.

In some embodiments, the ED device may comprise a monovalent selective ion exchange membrane. The monovalent selective ion exchange membrane may comprise a polymeric microporous substrate having a cross-linked ion-transferring polymeric layer on a surface of the substrate and a charged functionalizing layer covalently bound to the cross-linked ion-transferring polymeric layer by an acrylic group. The monovalent selective ion exchange membrane may be a cation exchange membrane having a positively charged functionalizing layer comprising at least one of a sulfonic acid group, a carboxylic acid group, a quaternary ammonium group, and a tertiary amine group hydrolyzed into a positively charged ammonium. The monovalent selective membrane may be an anion exchange membrane having a negatively charged functionalizing layer. The monovalent selective membrane may have a resistivity of less than about 5 $\Omega\cdot cm^2$. Exemplary monovalent selective membranes are described in more detail in U.S. Patent Application Publication Nos. 2022/0062828; 2022/0062829, titled "Monovalent Selective Cation Exchange Membrane," each of which are incorporated by reference herein in their entireties for all purposes.

The systems and methods described herein may be operated on a continuous or a batch basis and may be operated at a fixed location or on a mobile platform, such as on board a vessel or on a vehicle. Multi-pass EDI systems may also be employed wherein feed is typically passed through the device two or more times, or may be passed through an optional second device. In some cases, the electrodialysis device may be heated to, for example, increase the rate of ionic species transport therein. Thus, the electrodialysis device may be operated at ambient temperature (about 25° C.). Alternatively, the electrodialysis device may be operated at a temperature greater than about 30° C., greater than about 40° C., or greater than about 50° C.

The non-potable water feed is generally pressurized for introduction through the nanofiltration device. Thus, the methods may comprise directing the non-potable water feed to the nanofiltration device at a selected pressure, for example, by directing the non-potable water feed to a pump upstream from the nanofiltration device. Thus, in certain embodiments, a pump may be utilized to pressurize the non-potable water feed to the nanofiltration device. Typically, the pump pressurizes the feed to an operating pressure of about 600 psi or less, for example, 200 psi to 600 psi, or 400 psi to 600 psi, while having an energy requirement of about 2.8 kWh/m$^3$, for example, about 2.6 kWh/m$^3$, or about 2.4 kWh/m$^3$. The pump may operate at an efficiency of greater than or about 75%, for example, greater than or about 80%, greater than or about 85%, greater than or about 90%, greater than about 95%, or greater than about 98%.

In one exemplary embodiment, a pump operating to pressurize the non-potable water feed to 200 psi-600 psi may have a power requirement between 40 kW and 80 kW, or between 40 kW and 60 kW, depending on flow rate. For example, for a feed stream having a flow rate of 500 gpm and a target pressure of 200 psi, a pump having 75% efficiency may require about 43.88 kW hydraulic power and 57.85 kW shaft power.

In accordance with some embodiments, the pump may be associated with an energy recovery device. For instance, the system may use energy recovered from a downstream stream to pressurize the non-potable water feed. In certain embodiments, the systems and methods may involve energy recovery from the nanofiltration reject. In particular, the nanofiltration reject emerging from a pressurized non-potable water feed directed to the nanofiltration device is believed to have a sufficient pressure from which energy may be recovered to continue to pressurize the same non-potable water feed. Thus, in some embodiments, the methods may comprise directing the nanofiltration reject stream to an energy recovery device to pressurize the non-potable water feed directed to a pump of the energy recovery device.

The energy recovery device may be configured to recover at least 40% of energy, for example, at least 50%, at least 60%, at least 70%, at least 80%, at least 90%, at least 95%, or at least 98% of energy from the nanofiltration reject while pressurizing the non-potable water feed. The energy recover device may be configured to pressurize the non-potable water feed to at least about 200 psi, for example, about 200 psi-600 psi, at least about 400 psi, about 400 psi-600 psi, or about 600 psi, while having an energy requirement of about 0.5-1.5 kWh/$m^3$, for example, about 0.5-1.0 kWh/$m^3$, about 1.0-1.25 kWh/$m^3$, or about 1.25-1.5 kWh/$m^3$.

One exemplary energy recovery device (iSave® Energy Recovery Device, distributed by Danfoss, Nordborg, Denmark) utilizes an isobaric pressure exchanger to recover energy which is then transferred to a positive displacement pump. The booster pump may be based on a vane pump, a fixed displacement pump in which the flow is proportional to the number of revolutions (rpm) of the driving shaft, enabling flow control.

The energy recovery device may be a pressure exchange energy recovery device (for example, as distributed by Energy Recovery, Inc., San Leandro, CA). Pressure exchange technology may be employed to act like a fluid piston, efficiently transferring energy between high-pressure liquid, such as the nanofiltration reject, and low-pressure liquid, such as the non-potable water feed. In such a device, pressure exchange may be achieved through a rotating duct configured to alternate between a sealed phase with isolated high- and low-pressure fluids and a pressure exchange phase.

Other energy recovery devices, such as a turbine-based energy recovery device and pump construct (distributed by Fluid Equipment Development Company (FEDCO) Los Angeles, CA) may be used in the systems described herein.

The systems and methods may further find efficiencies in a plurality of recycle conduits directed throughout the system. Recent developments in ion exchange membrane technology have enabled the use of ED devices capable of producing potable water with reduced water loss between the dilute and concentrate compartments. Furthermore, performance of such ED devices may be improved by balancing conductivity between the dilute and concentrate streams. Thus, the systems disclosed herein may utilize selective recirculation of concentrate streams to improve performance of the ED devices in water desalination.

The systems and methods disclosed herein may be employed to redirect output streams from one or more ED device to improve desalination, for example, by effectuating regeneration or recharging of the ED device. In particular embodiments, the output streams may be effectively redirected, and optionally combined with other streams such as the non-potable feed water and a partially desalinated water stream, to reduce or eliminate fouling on the membranes. Accordingly, the systems and methods disclosed herein may be designed to reduce or eliminate the need to perform a polarity reversal of the ED device, which increases water recovery of the system.

In general, some aspects of the disclosure utilize byproduct streams, such as concentrate streams, to improve upstream treatment and/or to reduce water loss within the system. The byproduct streams may be combined with lower TDS or higher TDS streams in selected ratios to produce feed waters having desired properties. In particular, a feed water directed to a concentrate compartment of an ED unit may tolerate any greater TDS than the feed water directed to the dilute compartment of the ED unit. Accordingly, higher TDS byproduct streams may be recovered by being combined with lower TDS streams and directed to concentrate compartments.

For instance, the methods may comprise recycling or recirculating at least a portion of a concentrate stream produced by the ED unit back to its own concentrate compartment. The concentrate stream may be combined with a lower TDS stream, such as a dilute stream from the same or a prior ED unit or a nanofiltration permeate. In one exemplary embodiment, a portion of a concentrate stream from a second or subsequent ED unit may be recycled to the concentrate compartment of the same ED unit with a portion of a dilute stream from a first or prior ED unit. Thus, in certain embodiments, the methods may comprise directing a portion of a dilute stream from the first or prior ED unit with a portion of a concentrate stream from the second or subsequent ED unit to the concentrate compartment of the second or subsequent ED unit to produce the concentrate stream.

In some embodiments, the methods may comprise recycling a portion of the concentrate stream from a second or subsequent ED unit to the concentrate compartment of a first or prior ED unit. The concentrate stream from the second or subsequent ED unit may be combined with a higher TDS stream, such as the non-potable water feed or nanofiltration reject. Thus, in certain embodiments, the methods may comprise directing a portion of the concentrate stream from the second or subsequent ED unit with non-potable water feed to the concentrate compartment of the first or prior ED unit to produce the concentrate stream.

Additionally, one or more nanofiltration reject and/or ED concentrate stream may be at least partially directed upstream from the nanofiltration device and combined with the non-potable water feed. In accordance with one or more embodiments at least a portion of reject and concentrate fluids that result from the process, typically containing greater amounts of TDS than their respective feed waters, can be directed to the feed water source. Concentrate effluent from the ED device may be recycled as feed water or combined with feed water directed to the nanofiltration device. Recycling such streams may reduce water loss within the system.

In some cases, for example, when a concentrate brine is produced from the concentrate compartment of one or more ED device, the concentrate, which may be substantially or essentially free of divalent and multivalent ions, or have a reduced level of scale-forming species, may be used as a source for the production of a disinfectant, such as, but not limited to, sodium hypochlorite. The softened brine solution may provide a source of electrolyzable chlorine species for use in a disinfectant-forming system which can utilize, for example, an electrolytic device. Thus, if purified water produced utilizing some aspects disclosed herein can benefit from later disinfection, a ready source of softened, concentrated brine, and/or disinfectant, can be available at low cost.

The methods may comprise controlling a ratio of process or recycle streams directed to more than one system operation. The ratio of the process or recycle streams may be controlled to maximize product water and minimize water loss, while optimizing operation of the system units with effective recycle streams. Thus, the system can be both designed and operated in a way that maximizes water recovery. In some embodiments, operation of the system may be manual. In other embodiments, operation of the system may be automatic. Automatic operation may be responsive to a preset program or algorithm including, for example, timed intervals. Optionally, automatic operation of the system may be responsive to one or more measured parameter, for example, water composition, pH, pressure, temperature, conductivity, velocity, flow rate, or other measured parameter. In some embodiments, the system may comprise a sensor configured to measure one or more of the parameters. The sensor may be operably connected to a controller configured to direct process or recycle streams responsive to the sensor measurement. In yet other embodiments, automatic operation of the system (for example, as directed by the controller) may be responsive to anticipated or predicted parameters determined by historical data and/or expected events. Thus, in some embodiments, the controller may comprise a processor operably connected to a database or other memory storage device. The system may be automatically operated based on a combination of the described input parameters.

In some embodiments, the methods may comprise controlling a ratio of a first portion of a dilute stream from a first or prior ED unit directed to the dilute compartment of a second or subsequent ED unit to a second portion of the dilute stream directed to the concentrate compartment of the second or subsequent ED unit. As previously described, the dilute stream from the first ED unit may be directed to the dilute compartment of the second or subsequent ED unit to produce a product or further desalinated stream. The dilute stream from the first ED unit may be directed to the concentrate compartment of the second or subsequent ED unit for combination with a recycled concentrate stream. The ratio of the first portion of the dilute stream to the second portion of the dilute stream may be selected to maximize water directed to the dilute compartment of the second or subsequent ED unit while providing sufficient dilute water to the concentrate compartment of the second or subsequent ED unit for efficient operation. In some embodiments, 92%-88% of the dilute stream from the first ED unit may be directed to the dilute compartment of the second ED unit.

In some embodiments, the methods may comprise controlling a ratio of a first portion of a concentrate stream from a second or subsequent ED unit directed to the concentrate compartment of the second or subsequent ED unit to a second portion of the concentrate stream directed to the concentrate compartment of the first or prior ED unit. As previously described, the concentrate stream from the second or subsequent ED unit may be directed to the concentrate compartment of the second or subsequent ED unit for recirculation. The concentrate stream from the second or subsequent ED unit may be directed to the concentrate compartment of the first or prior ED unit for additional recirculation. The ratio of the first portion of the concentrate stream to the second portion of the concentrate stream may be selected to maximize water recovery by combination with other available streams to produce appropriate feed waters directed to the concentrate compartments for efficient operation. In some embodiments, 92%-88% of the concentrate stream from the second ED unit may be directed back to the concentrate compartment of the second ED unit.

Thus, the methods may comprise controlling a composition of the feed to a concentrate compartment. In general, the feed stream directed to a concentrate compartment may have a higher TDS concentration than the feed stream directed to a dilute compartment. Furthermore, the feed stream directed to the concentrate compartment of a first or prior ED unit may have a higher TDS concentration than the feed stream directed to the concentrate compartment of a second or subsequent ED unit. When recirculating streams within the system, such streams may be combined with a higher or lower TDS concentration stream in a selected ratio to provide a stream having desired properties. The streams may be combined in a ratio that maximizes water recovery of the produced concentrate streams.

Prior to treatment of the feed water, a variety of pretreatment procedures can be employed. For example, pre-treatment may be performed on a feed water that may contain solids or other materials that may interfere with or reduce the efficiency of any stage or device, such as the nanofiltration device or the ED unit. Pretreatment processes may be performed to remove or reduce one or more of bulk particulates, microbial contaminants, and other harmful colloidal constituents in the source water. Pretreatment processes may be performed upstream of the nanofiltration device and/or the ED device and may include a media filter, such as particulate filtration, sand filtration, carbon filtration, microfiltration, combinations thereof and other methods directed to the reduction of particulates. Adjustments to the pH and/or alkalinity of feed water may also be performed by, for example, the addition of an acid, base or buffer, or through aeration.

Thus, in accordance with some embodiments, the methods may comprise directing a non-potable water source to a pretreatment unit, such as a media filter, to produce the non-potable water feed. In one exemplary embodiment, sand filtration is performed upstream from the nanofiltration device. Sand filtration may beneficially require less energy than other filtration devices (such as ultrafiltration), while producing a suitable feed stream for a nanofiltration device. In accordance with certain embodiments, the non-potable water source may be desalinated without ultrafiltration and/or reverse osmosis treatment.

One exemplary sand filter is a Vortisand® Industrial Filtration System (distributed by Evoqua Water Technologies, Pittsburgh, PA), which utilizes cross-flow microsand filtration (CMF). CMF is a high-capacity media filter that combines cross-flow dynamics with microsand media to achieve submicron filtration performance, allowing the unit to operate at filtration rates of up to 4 times greater than other media filters, while filtering 10-50 times finer. CMF has the benefit of reducing water consumption, saving energy, reducing chemical costs, and having minimal maintenance requirements. In particular, CMF has been shown to exhibit improved efficiency at reducing suspended solids and Silt Density Index (SDI) from seawater having 5-20 Nephelometric Turbidity Units (NTU), while also reducing energy requirements for the pretreatment stage of the desalination process, as compared to conventional ultrafiltration pretreatment.

Additionally, in certain embodiments, product water produced by a final stage ED unit may be directed to an electrodeionization device, such as a CEDI, to produce a polished product water. The polished product water may comply with regulatory requirements for drinking water.

EDI devices are similar to ED devices, except that they contain electrically active media between the membranes. Briefly, EDI is a process that removes, or at least reduces, one or more ionized or ionizable species from water using electrically active media and an electric potential to influence ion transport. The electrically active media typically serves to alternately collect and discharge ionic and/or ionizable species and, in some cases, to facilitate the transport of ions, which may be continuously, by ionic or electronic substitution mechanisms. EDI devices can comprise electrochemically active media of permanent or temporary charge, and may be operated batch-wise, intermittently, continuously, and/or even in reversing polarity modes. EDI devices may be operated to promote one or more electrochemical reactions specifically designed to achieve or enhance performance.

Continuous electrodeionization (CEDI) devices are EDI devices that operate in a manner in which water purification can proceed continuously, while ion exchange material is continuously recharged. See, for example, U.S. Pat. Nos. 6,824,662; 6,312,577; 6,284,124; 5,736,023; and 5,308,466; each of which is incorporated by reference herein. CEDI techniques can include processes such as continuous deionization, filled cell electrodialysis, or electrodiaresis. Under controlled voltage and salinity conditions, in CEDI systems, water molecules can be split to generate hydrogen or hydronium ions or species and hydroxide or hydroxyl ions or species that can regenerate ion exchange media in the device and thus facilitate the release of the trapped species therefrom. In this manner, a water stream to be treated can be continuously purified without requiring chemical recharging of ion exchange resin.

One exemplary system for water desalination is shown in FIG. 1. Water desalination system 1000 comprises a source of non-potable water 140 fluidly connected to low pressure nanofiltration device 110. Energy recovery device 130 is fluidly connected between the source of non-potable water 140 and low pressure nanofiltration device 110. Energy recovery device 130 is also fluidly connected to a reject conduit 170 out of the nanofiltration device 110. Media filter 150 is also fluidly connected to source of non-potable water 140 upstream from nanofiltration device 110.

Water desalination system 1000 also comprises a first electrodialysis unit having a dilute compartment 120A fluidly connected to a permeate conduit 160 out of the nanofiltration device 110 and a concentrate compartment 120B fluidly connected to the source of non-potable water 140 and concentrate conduit 196 via conduit 142. Water desalination system 1000 comprises a second electrodialysis unit having a dilute compartment 122A fluidly connected to a dilute conduit 180 out of dilute compartment 120A and a concentrate compartment 122B fluidly connected to dilute conduit 182 out of dilute compartment 120A and concentrate conduit 192 out of concentrate compartment 122B via conduit 194. Product water is produced by dilute compartment 122A via product conduit 184 and polished by EDI unit 152.

Figure 2:
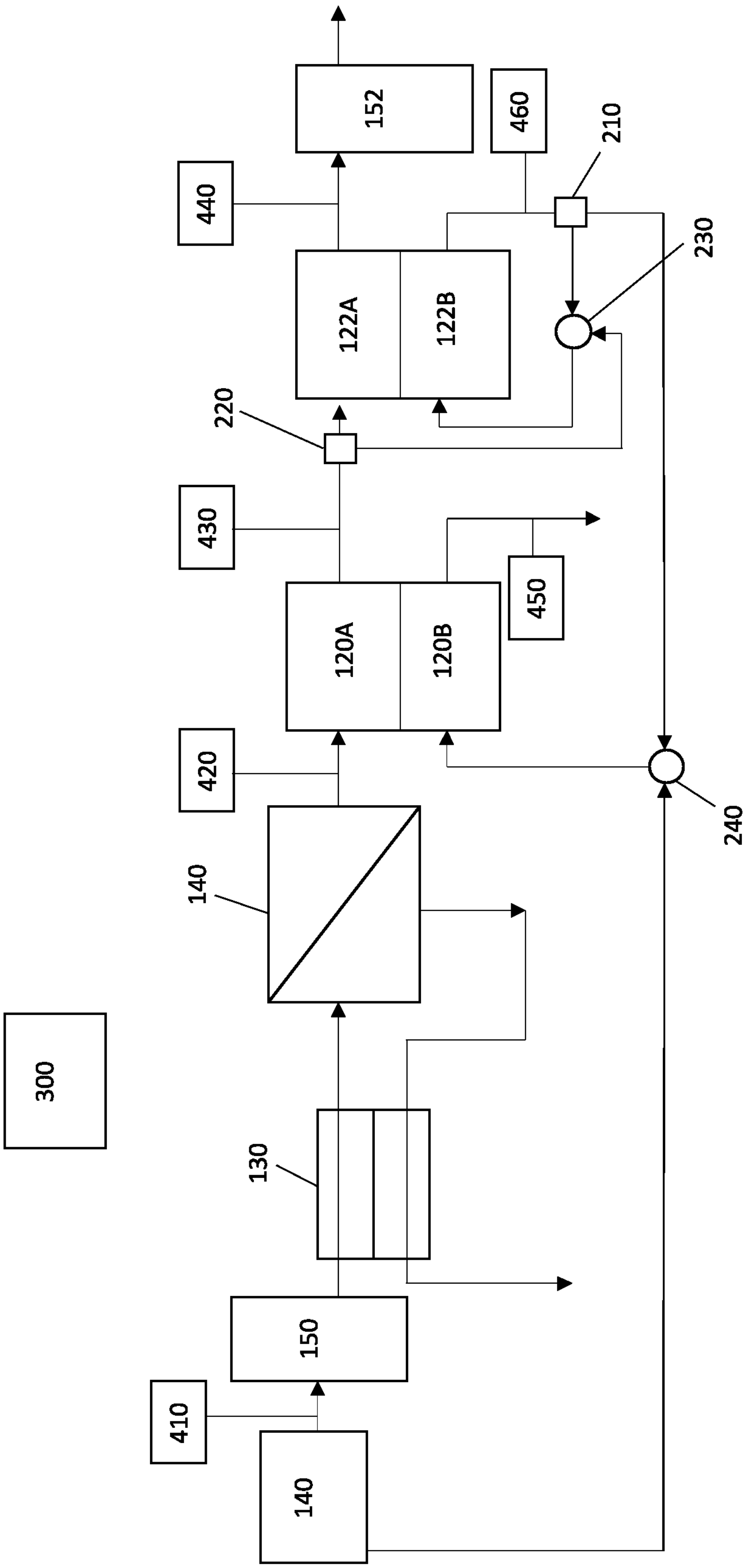
FIG. 2 is a schematic diagram of a water desalination system, according to one embodiment.

Another exemplary water desalination system is shown in FIG. 2. Water desalination system 2000 of FIG. 2 is similar to water desalination system 1000, except that it includes a first valve 210 positioned to selectively direct a portion of concentrate stream to concentrate compartment 122B via conduit 192 and a portion of concentrate stream to concentrate compartment 122A via conduit 196. Water desalination system 2000 also comprises a second valve 220 positioned to selectively direct a portion of a dilute stream from dilute compartment 120A to dilute compartment 122A and a portion of the dilute stream dilute compartment 120A to concentrate compartment 122B. Water desalination system 2000 also comprises valve 230 positioned to combine concentrate stream from conduit 192 and dilute stream from conduit 182 for transferring to concentrate compartment 122B. Water desalination system 2000 also comprises valve 240 positioned to combine concentrate stream from conduit 196 and non-potable water feed from the source of non-potable water 140 for transferring to concentrate compartment 120B.

Valves 210, 220, 230, and 240 are operably connected to controller 300. Water desalination system 2000 also includes sensors 410, 420, 430, 440, 450, and 460 positioned downstream from the various system components to measure one or more parameter of the streams. Sensors 410, 420, 430, 440, 450, and 460 are operably connected to controller 300. Controller 300 may be configured to selectively direct streams within the system via valves 210, 220, 230, and 240, optionally responsive to a measurement of a parameter received from one or more of sensor 410, 420, 430, 440, 450, and 460.

The controller may be associated with or more processors typically connected to one or more memory devices, which can comprise, for example, any one or more of a disk drive memory, a flash memory device, a RAM memory device, or other device for storing data. The memory device may be used for storing programs and data during operation of the system. For example, the memory device may be used for storing historical data relating to the parameters over a period of time, as well as operating data. In some embodiments, the controller disclosed herein may be operably connected to an external data storage. For instance, the controller may be operably connected to an external server and/or a cloud data storage.

Any controller disclosed herein may be a computer or mobile device or may be operably connected to a computer or mobile device. The controller may comprise a touch pad or other operating interface. For example, the controller may be operated through a keyboard, touch screen, track pad, and/or mouse. The controller may be configured to run software on an operating system known to one of ordinary skill in the art. The controller may be electrically connected to a power source.

The controller disclosed herein may be digitally connected to the one or more components. The controller may be connected to the one or more components through a wireless connection. For example, the controller may be connected through wireless local area networking (WLAN) or short-wavelength ultra-high frequency (UHF) radio waves. The controller may be coupled to a memory storing device or cloud-based memory storage.

The controller disclosed herein may be configured to transmit data to a memory storing device or a cloud-based memory storage. Such data may include, for example, operating parameters, measurements, and/or status indicators of the system components. The externally stored data may be accessed through a computer or mobile device. In some embodiments, the controller or a processor associated with the external memory storage may be configured to notify a user of an operating parameter, measurement, and/or status of the system components. For instance, a notification may be pushed to a computer or mobile device notifying the user. Operating parameters and measurements include, for example, properties of the source of non-potable water or other process stream. Status of the system components may include, for example, pressure, voltage, and whether any system component requires regular or unplanned maintenance. However, the notification may relate to any operating parameter, measurement, or status of a system component disclosed herein. The controller may further be configured to access data from the memory storing device or cloud-based memory storage. In certain embodiments, information, such as system updates, may be transmitted to the controller from an external source.

It should be noted that multiple controllers may be programmed to work together to operate the system. For example, one or more controller may be programmed to work with an external computing device. In some embodiments, the controller and computing device may be integrated. In other embodiments, one or more of the processes disclosed herein may be manually or semi-automatically executed.

In accordance with another aspect, there is provided a method of facilitating water desalination. The method may comprise providing a water desalination system which is fluidly connectable to a source of non-potable water. The water desalination system may be provided on a skid. The method may comprise providing instructions to operate the water desalination system in accordance with the methods described herein. The methods may comprise providing one or more recycle conduits to direct recycle streams within the system, for example, as shown in FIG. 1. In some embodiments, the methods may comprise providing a controller. The controller may be configured to selectively direct streams within the water desalination system, as previously described.

EXAMPLES

Example 1: Mass Balance for Seawater Desalination

A system was modeled for water desalination of seawater having 31,320 ppm TDS at a feed flow rate of 35.0 $m^3$/h. The system included an energy recovery device, a nanofiltration device having 4 pressure vessels in parallel and 6 elements per vessel, and two ED stages positioned in series, each having 5 modules in parallel. The nanofiltration device operated at 21.85 kW. A 90% energy recovery for the energy recovery device was assumed. The first ED stage operated at 7.2 kW (1.44 kW/module). The second stage operated at 3.95 kW (0.79 kW/module). A mass balance for the system is shown in FIG. 3.

Figure 3:
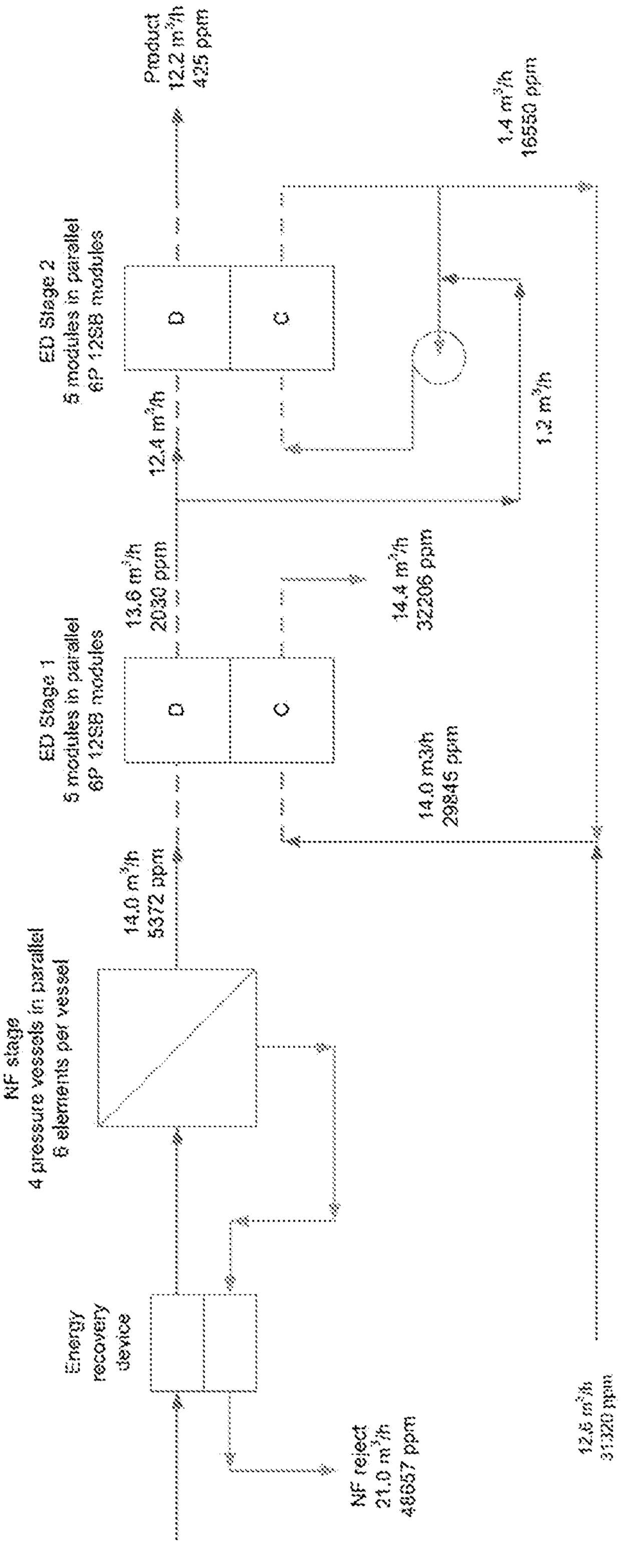
FIG. 3 is a schematic diagram showing a mass balance of a water desalination system, according to one embodiment.

As shown in FIG. 3, 8%-12% of the dilute stream produced by the dilute compartment of the first ED module is directed to the concentrate compartment of the second ED module. Recirculation of the concentrate stream from the second concentrate compartment makes up to the remainder of the concentrate feed. About 8%-12% of the concentrate stream from the concentrate compartment of the second ED module is directed to the concentrate compartment of the first ED module. Seawater makes up the remainder of the concentrate feed to produce a stream having 29,845 ppm TDS. The produce water produced by the dilute compartment of the ED module has 425 ppm TDS, below the desired 500 ppm TDS threshold for drinking water.

The system of FIG. 3 operates under a total energy requirement of 33.0 kW or 2.7 kW/$m^3$ of water desalinated. A 25.6% water recovery was observed for the system. However, it is believed that water recovery can be improved by directing one or both of the nanofiltration reject and the concentrate stream from the first ED module to the seawater feed.

Example 2: Energy Recovery Device

Energy reduction was calculated for systems operated with an energy recovery device at varying water temperature, nanofiltration product flow rate, feed flow rate to the energy recovery device, and feed TDS concentration. The results are shown in Tables 1A-1C. Table 1D includes comparative data for an RO system.

TABLE 1A

NF System Energy Reduction for Feed 32,000 TDS

| Temperature | NF product flow rate | Feed flowrate to HP and ERD | Feed TDS | Product TDS | Flux | Energy |
|---|---|---|---|---|---|---|
| 31° C. | 7 $m^3$/h | 16 $m^3$/h | 32,000 ppm | 6,480 ppm | 14.1 | 1.53 kWh/$m^3$ |
| 34° C. | 7 $m^3$/h | 16 $m^3$/h | 32,000 ppm | 7,369 ppm | 14.1 | 1.28 kWh/$m^3$ |

Specific Energy = from 2.8 to 1.53 kWh/$m^3$
Energy reduction = 45.36%

TABLE 1B

NF System Energy Reduction for Feed 26,000 ppm

| Temperature | NF product flow rate | Feed flowrate to HP and ERD | Feed TDS | Product TDS | Flux | Energy |
|---|---|---|---|---|---|---|
| 31° C. | 7 $m^3$/h | 16 $m^3$/h | 26,000 ppm | 5,128 ppm | 14.1 | 1.25 kWh/$m^3$ |
| 34° C. | 7 $m^3$/h | 16 $m^3$/h | 26,000 ppm | 5,838 ppm | 14.1 | 1.05 kWh/$m^3$ |

Specific Energy = from 2.4 to 1.25 kWh/$m^3$
Energy reduction = 47.92%

TABLE 1C

NF System Energy Reduction for NF Flow Rate 50 $m^3$/h

| Temperature | NF product flow rate | Feed flowrate to HP and ERD | Feed TDS | Product TDS | Flux | Energy |
|---|---|---|---|---|---|---|
| 31° C. | 50 $m^3$/h | 119.7 $m^3$/h | 26,000 ppm | 5,051 ppm | 14.1 | 1.37 kWh/$m^3$ |
| 34° C. | 50 $m^3$/h | 119.7 $m^3$/h | 26,000 ppm | 5,754 ppm | 14.1 | 1.15 kWh/$m^3$ |

Specific Energy = from 2.43 to 1.37 kWh/$m^3$
Energy reduction = 43.62%

TABLE 1D

RO System Energy Reduction

| Temperature | NF product flow rate | Feed flowrate to HP and ERD | Feed TDS | Product TDS | Flux | Energy |
|---|---|---|---|---|---|---|
| 31° C. | 7 $m^3$/h | 14 $m^3$/h | 26,000 ppm | 6,252 ppm | 10.2 | 1.05 kWh/$m^3$ |
| 34° C. | 7 $m^3$/h | 14 $m^3$/h | 26,000 ppm | 7,051 ppm | 10.2 | 0.87 kWh/$m^3$ |

Specific Energy = from 1.69 to 1.05 kWh/$m^3$
Energy reduction = 37.87%

As shown in Tables 1A-1D, use of the energy recovery device in the nanofiltration systems resulted in an energy reduction of 40%-50%. Use of the energy recovery device in the comparative RO system only resulted in an energy reduction of 37%. Accordingly, the energy reduction provided by an energy recovery device in a nanofiltration system is greater.

Several energy recovery devices were tested in a water desalination system as disclosed herein, assuming a product flow rate of 50 $m^3$/hr and specific energy of 2.43 kWh/$in^3$.

The first energy reduction device operated at an energy of 1.37 $kWh/in^3$ (43.62% energy recovery); the second energy recovery device operated at an energy of 1.4 $kWh/m^3$ (42.38% energy recovery); the third energy recovery device operated at an energy of 1.082 $kWh/m^3$ (55.47% energy recovery).

Energy usage of the system can be calculated using the following equation:

$$\text{Energy} = (Q_{NF} \times E_{NF}) + (Q_{ED1} \times E_{ED1}) + (Q_{ED2} \times E_{ED2}) / (Q_{ED2}),$$

where $Q_{NF}$ is flow rate of the NF product stream; EN is energy of the NF (as determined by the energy reduction device); $Q_{ED1}$ is flow rate of the first ED stage; $E_{ED1}$ is energy of the first flow rate stage; $Q_{ED2}$ is flow rate of the second ED stage; and $E_{ED2}$ is energy of the second flow rate stage.

The total energy was calculated assuming the first ED stage operates at an energy of 0.24 $kWh/m^3$ and the second ED stage operates at an energy of 0.36 $kWh/m^3$; the NF flow rate is 3.5908 $m^3/h$, the ED1 flow rate is 1.692 $m^3/h$, and the ED2 flow rate is 1.5228 $m^3/h$. A system having an energy reduction of 55.47% (1.082 $kWh/m^3$), as provided by the third energy recovery device described above, operates at a total energy of 3.38 $kWh/m^3$. However, a system having an energy reduction of 75.3% (0.6 $kWh/m^3$) operates at a total energy of 2.24 $kWh/m^3$.

Accordingly, energy recovery devices may further reduce the total energy requirement of the system.

Example 3: Concentrate Feed Stream

Two desalination systems were modeled having different feed streams to the concentrate compartment of the first ED stage. Each ED stage was formed of 5 modules. Seawater having 32,000 ppm TDS was directed to the nanofiltration device. A feed stream of 2 cm/s was assumed for the dilute and concentrate compartments of the first ED stage.

Figure 4:
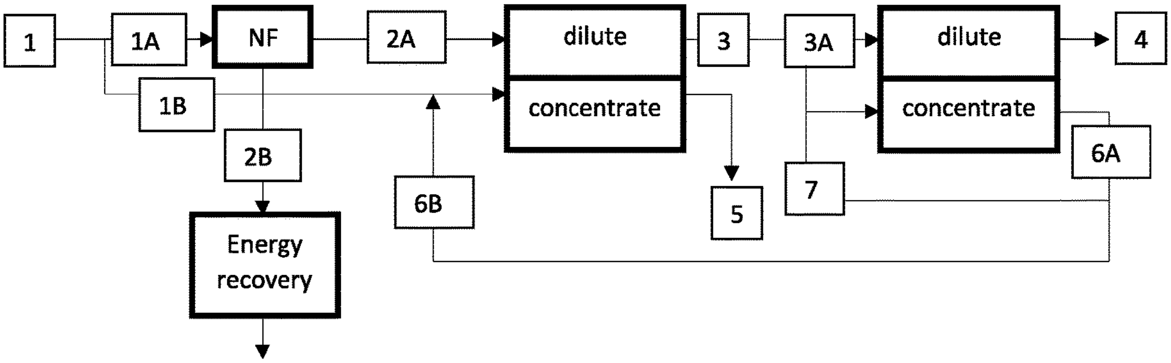
FIG. 4 is a schematic diagram showing a mass and energy balance of a water desalination system, according to one embodiment.

The first system is shown in FIG. 4. As shown in FIG. 4, 65%-70% of the seawater feed was directed to the nanofiltration device. The first ED stage concentrate feed stream was formed from the remainder of the seawater feed combined with concentrate stream recycle (10%) from the second ED stage. The concentrate stream from the first ED stage was directed to waste.

Figure 5:
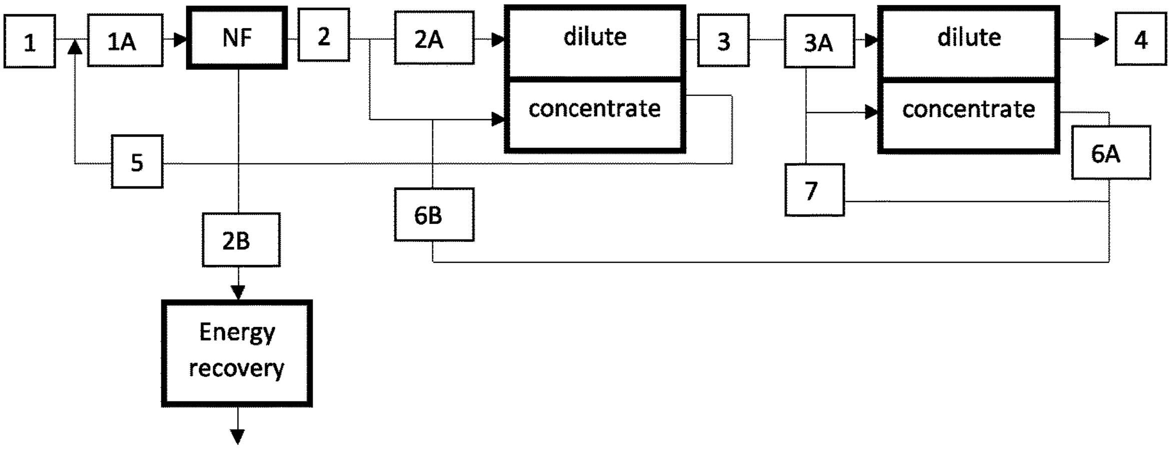
FIG. 5 is a schematic diagram showing a mass balance of a water desalination system, according to one embodiment.

The second system is shown in FIG. 5. As shown in FIG. 5, the first ED stage concentrate feed stream was formed from nanofiltration permeate (50%-55%) combined with concentrate stream recycle (10%) from the second ED stage. The concentrate stream from the first ED stage was recycled to the seawater feed stream and directed to the nanofiltration module.

When operating at a water loss of 10%, for both systems, the first ED stage was operated at an energy requirement of 0.42 $kWh/m^3$, and the second ED stage was operated at an energy requirement of 0.36 $kWh/m^3$. Both systems were capable of producing a product stream having 206 ppm TDS, below the desired 500 ppm TDS threshold for drinking water. Comparative systems running RO for desalination required 2.8 $kWh/m^3$ and 2.43 $kWh/m^3$, respectively.

Accordingly, the systems described herein are capable of producing potable water at energy requirements below conventional RO systems.

Example 4: Properties of Recycle Streams

Some embodiments described herein relate to aspects that advantageously utilize byproduct streams from one or more stages to effect regeneration or recharging of one or more other stages. A dischargeable stream or byproduct stream from one or more stages of the system can have a high concentration of a first dissolved species removed from the water to be treated. The presence of the first dissolved species in such a stream can facilitate regeneration of other unit operations in one or more other purification stages. For example, an electrodialysis stage can remove or reduce the concentration of monovalent species from seawater.

For example, Table 2 provides concentrations of primary typical solutes found to make up the salts comprised in a typical seawater. Based on those constituents and assuming about 80% overall TDS (total dissolved solids) removal in a first stage operating at about 67% water recovery, comprising monovalent selective anion and cation exchange membranes, the solute makeup of the depleting and concentrating stream effluent from the stage as a function of membrane selectivity coefficient can be determined. Membrane selectivity coefficient can be defined as $$\text{Selectivity} = \frac{\frac{\Delta v_{Na}}{v_{Na}}}{2\left[\frac{\Delta v_{Ca} + \Delta v_{Mg}}{v_{Ca} + v_{Mg}}\right]}$$

where v is the molarity of ionic species i and Δv is the change in the molarity of the ionic species. Table 3 provides calculated values of solutes remaining in the ion depleting stream and ion concentrating stream effluents from a first stage separation apparatus comprising monovalent selective anion and cation membranes with selectivities of 1 (non-selective), 5, and 10. The data in Table 3 were derived for a product water with about 20,000 ppm TDS and an assumed recovery rate of about 67%.

TABLE 2

Seawater Typical Composition.

| Species | Concentration Ppm |
|---|---|
| Chloride | 19,000 |
| Sulfate | 2,700 |
| Bromide | 65 |
| Silicate | 3 |
| Iodide | 0.06 |
| Phosphate | 0.07 |
| Sodium | 16,500 |
| Magnesium | 1,350 |
| Calcium | 400 |
| Potassium | 380 |
| Lithium | 0.17 |
| Boron | 4.6 |
| Strontium | 8 |
| Molybdenum | 0.01 |
| Manganese | 0.002 |
| Aluminum | 0.01 |
| Cadmium | 0.00011 |
| Chromium | 0.00005 |
| Cobalt | 0.0004 |
| Copper | 0.003 |
| Iron | 0.06 |
| Lead | 0.00003 |
| Nickel | 0.007 |
| Selenium | 0.00009 |
| Silver | 0.0003 |
| Zinc | 0.01 |

TABLE 3

Depleting and concentrating Stream properties using softened seawater into 2-stage ED devices.

| Monovalent Selective ED | | Double Selective ED | | Non-Selective ED | |
|---|---|---|---|---|---|
| Ca concentration, mmol/L | LSI | Ca concentration, mmol/L | LSI | Ca Concentration, mmol/L | LSI |
| 5.1 | 1.08 | 2.63 | 0.79 | 17.78 | 1.62 |

As can be seen in Table 3, for devices comprising monoselective membranes, the concentrations of solutes such as calcium, magnesium, and sulfate, which tend to cause fouling and scaling of the concentrating compartments of the device, are maintained at relatively low concentration levels in the concentrating stream relative to devices utilizing comprising nonselective membranes. The result is that use of monovalent selective membrane devices enables increased water recovery without causing salt precipitation and resulting performance loss, or plugging of the desalting device. Monovalent selectivity may not necessarily disproportionately lower bicarbonate levels in the concentrating stream, but the potential for precipitation of bicarbonate compounds such as calcium bicarbonate is nevertheless reduced because of the disproportionate lowering of calcium levels (e.g., relative to sodium) in the concentrating stream. In addition, as will be discussed in more detail, acidic electrolyte products from the use of high salinity sodium chloride as an electrolyte can be used as a reagent feed to the concentrate stream, to adjust and lower the pH of the concentrate stream and thus inhibit the potential of any residual calcium bicarbonate in the concentrate stream to form scale, by shifting the bicarbonate equilibrium away from the carbonate form.

The byproduct stream (e.g., the concentrate stream of a monoselective ED stage) would have a high concentration of such species, e.g., sodium chloride, which can then be utilized to facilitate regeneration of an ion exchange unit operation that may then optionally be utilized to selectively remove or reduce the concentration of dissolved divalent species from the water to be treated. Moreover, where further stages including other types of unit operations are utilized to further remove or reduce the concentration of remaining species and/or trace impurities from a fraction of, or all the depleting stream, so that problematic constituents that remain in the depleting stream effluent of the first stage are selectively removed before end use (e.g., boron removal via selective ion exchange prior to being provided for agricultural irrigation water) or prior to being fed to a second membrane state of the overall system (e.g. calcium and magnesium removal via chemically regenerable cation exchange to avoid plugging and scaling in the second membrane stage).

By placing the optional ion exchange unit downstream of the first monoselective removal stage there is additional process advantage with respect to operation of the ion exchange unit. Operation of an ion exchanger, e.g., a cation exchanger for removal of calcium and magnesium from a source water, is much less efficient in its removal capability if the source water is high in overall salinity. Thus, by operation of the ion exchanger downstream of the first salt removal stage, whereby a large fraction of the salts are already removed compared to the source water, the ion exchanger will operate more efficiently and produce better quality effluent with less chemical need for regeneration.

Moreover, where further stages including types of units of operations are utilized to further remove or reduce the concentration of remaining species from the water stream, any byproduct streams therefrom can also be utilized to facilitate regeneration of one or more other unit operations in the other stages.

The phraseology and terminology used herein is for the purpose of description and should not be regarded as limiting. As used herein, the term "plurality" refers to two or more items or components. The terms "comprising," "including," "carrying," "having," "containing," and "involving," whether in the written description or the claims and the like, are open-ended terms, i.e., to mean "including but not limited to." Thus, the use of such terms is meant to encompass the items listed thereafter, and equivalents thereof, as well as additional items. Only the transitional phrases "consisting of" and "consisting essentially of," are closed or semi-closed transitional phrases, respectively, with respect to the claims. Use of ordinal terms such as "first," "second," "third," and the like in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Having thus described several aspects of at least one embodiment, it is to be appreciated various alterations, modifications, and improvements will readily occur to those skilled in the art. Any feature described in any embodiment may be included in or substituted for any feature of any other embodiment. Such alterations, modifications, and improvements are intended to be part of this disclosure, and are intended to be within the scope of the invention. Accordingly, the foregoing description and drawings are by way of example only.

The invention claimed is:

1. A water desalination system comprising:

A source of non-potable water;

A low pressure nanofiltration device having an inlet fluidly connectable to the source of the non-potable water, a permeate outlet, and a reject outlet;

A first electrodialysis unit comprising a dilute compartment having a dilute inlet and a dilute outlet and a concentrate compartment having a concentrate inlet and a concentrate outlet, the dilute inlet of the first electrodialysis unit being fluidly connected to the permeate outlet;

A second electrodialysis unit comprising a dilute compartment having a dilute inlet and a dilute outlet and a concentrate compartment having a concentrate inlet and a concentrate outlet, the dilute inlet of the second electrodialysis unit being fluidly connected to the dilute outlet of the first electrodialysis unit, The concentrate inlet of the first electrodialysis unit being fluidly connected to the concentrate outlet of the second electrodialysis unit and the source of the non-potable water, and The concentrate inlet of the second electrodialysis unit being fluidly connected to the concentrate outlet of the second electrodialysis unit and the dilute outlet of the first electrodialysis unit;

A first valve positioned to selectively direct a first portion of a concentrate stream from the second electrodialysis unit to the inlet of the concentrate compartment of the first electrodialysis unit and a second portion of the concentrate stream from the second electrodialysis unit to the inlet of the concentrate compartment of the second electrodialysis unit; and A second valve positioned to selectively direct a first portion of a dilute stream from the first electrodialysis unit to the inlet of the dilute compartment of the second electrodialysis unit and a second portion of the dilute stream from the first electrodialysis unit to the inlet of the concentrate compartment of the second electrodialysis unit.

2. The system of claim 1, further comprising an energy recovery device having a first inlet fluidly connectable to the source of the non-potable water, a first outlet fluidly connected to the inlet of the nanofiltration device, and a second inlet fluidly connected to the reject outlet.

3. The system of claim 2, wherein the energy recovery device is constructed and arranged to recover at least 80% of energy from a reject stream to pressurize a non-potable water feed.

4. The system of claim 3, wherein the energy recovery device is constructed and arranged to pressurize the non-potable water feed to between about 200 psi and 600 psi.

5. The system of claim 1, further comprising a media filter positioned between the source of the non-potable water and the nanofiltration device.

6. The system of claim 1, further comprising an electrodeionization unit fluidly connected to the dilute outlet of the second electrodialysis unit.

7. The system of claim 1, wherein the system is constructed and arranged to operate at less than 2.8 $kWh/m^3$ of water.

8. The system of claim 1, wherein the system is constructed and arranged to have a water recovery rate of 70%-90%.

9. The system of claim 1, wherein the nanofiltration device has a membrane comprising a polyamide layer on a porous support, the polyamide layer formed from a polyfunctional amine and a polyfunctional acid halide.

10. A method of desalinating a non-potable water feed having a total dissolved solids (TDS) concentration of between about 2,000 ppm and about 40,000 ppm, the method comprising:

Directing a first portion of the non-potable water feed to a low pressure nanofiltration device to produce a permeate stream and a reject stream;

Directing the permeate stream to a dilute compartment of a first electrodialysis unit to produce a dilute stream;

Directing a first portion of the dilute stream from the first electrodialysis unit to a dilute compartment of a second electrodialysis unit to produce a product stream having less than about 500 ppm TDS;

Directing a second portion of the dilute stream from the first electrodialysis unit to a concentrate compartment of the second electrodialysis unit to produce a concentrate stream;

Recycling a first portion of the concentrate stream from the second electrodialysis unit back to the concentrate compartment of the second electrodialysis unit with the second portion of the dilute stream from the first electrodialysis unit;

Recycling a second portion of the concentrate stream from the second electrodialysis unit to the concentrate compartment of the first electrodialysis unit with a second portion of the non-potable water feed to produce a concentrate stream;

Controlling a ratio of the first portion of the dilute stream directed to the dilute compartment of the second electrodialysis unit to the second portion of the dilute stream directed to the concentrate compartment of the second electrodialysis unit; and Controlling a ratio of the first portion of the concentrate stream recycled back to the concentrate compartment of the second electrodialysis unit to the second portion of the concentrate stream recycled to the concentrate compartment of the first electrodialysis unit.

11. The method of claim 10, further comprising:

directing the first portion of the non-potable water feed to an energy recovery device to pressurize the first portion of the non-potable water feed directed to the nanofiltration device;

and directing the reject stream to the energy recovery device to recover at least 80% of energy from the reject stream.

12. The method of claim 11, comprising directing the first portion of the non-potable water feed to the nanofiltration device at a pressure of between about 200 psi and 600 psi.

13. The method of claim 10, further comprising directing a seawater or brackish water stream to a media filter to produce the non-potable water feed.

14. The method of claim 10, further comprising directing the product stream to an electrodeionization unit to produce a polished product stream.

15. The method of claim 10, comprising desalinating the non-potable water feed at a water recovery rate of 70%-90%.

16. The method of claim 10, further comprising directing at least a portion of the concentrate stream from the first electrodialysis unit upstream from the nanofiltration device with the first portion of the non-potable water feed.

* * * * *